Dec. 30, 1947.  O. R. MILLER  2,433,385
SUBMARINE LOCATING SYSTEM
Filed Nov. 5, 1942  6 Sheets-Sheet 1
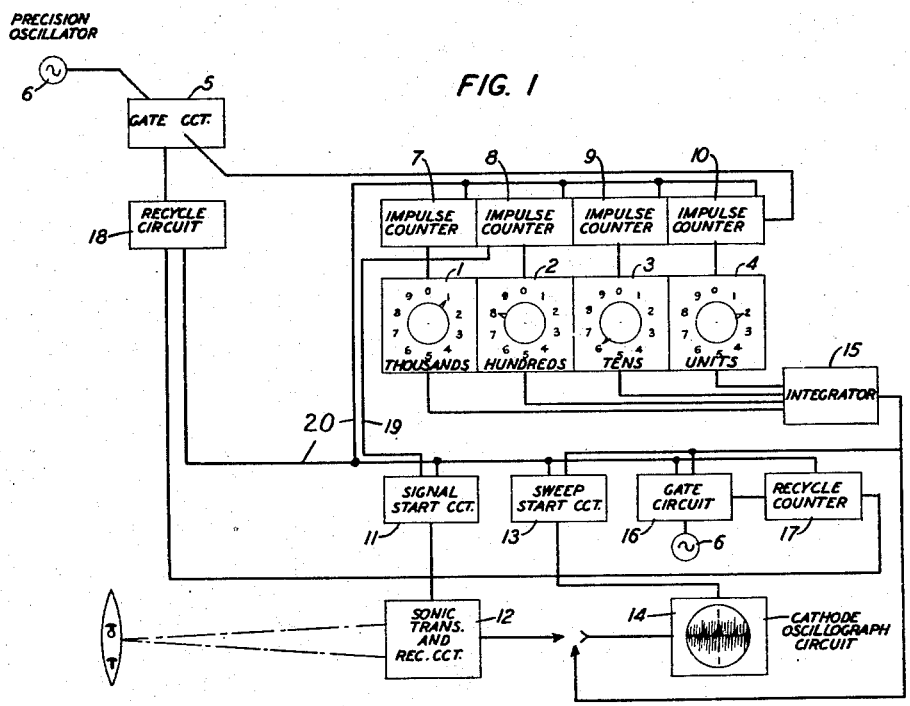
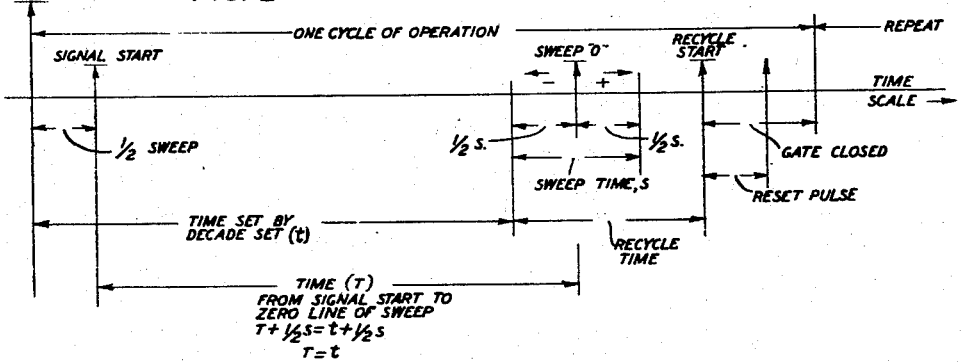
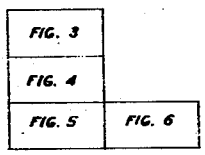
INVENTOR
O. R. MILLER
BY John Attall
ATTORNEY Dec. 30, 1947.  O. R. MILLER  2,433,385
SUBMARINE LOCATING SYSTEM
Filed Nov. 5, 1942  6 Sheets-Sheet 2
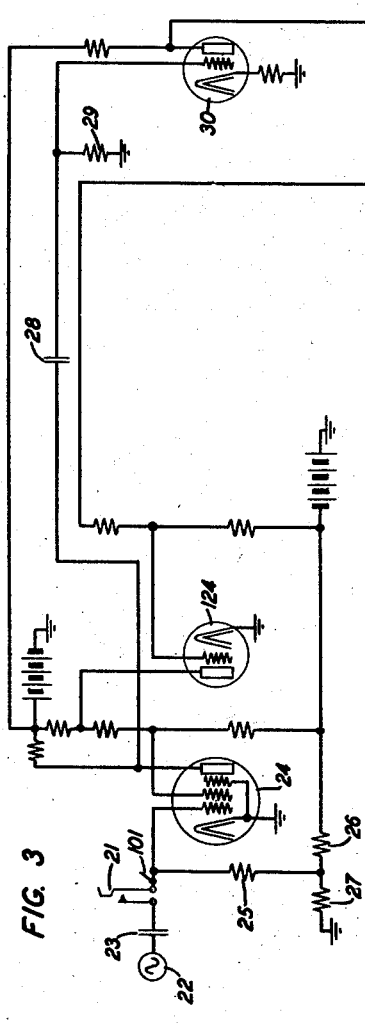
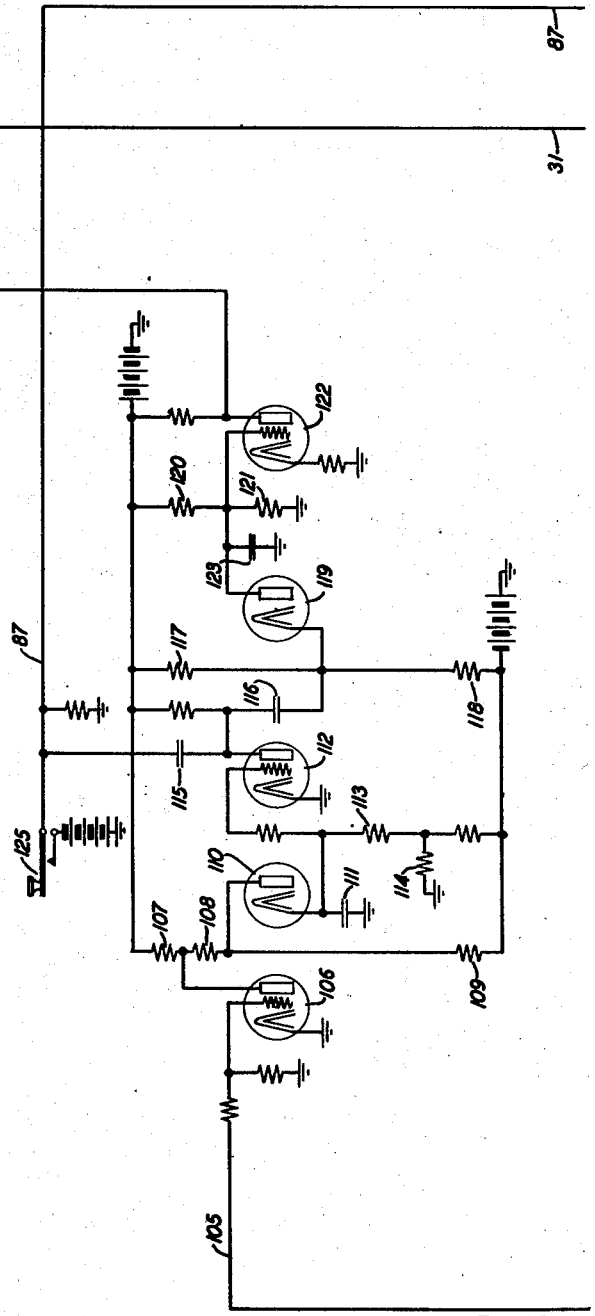
FIG. 3
INVENTOR
O. R. MILLER
BY John A. Hall
ATTORNEY

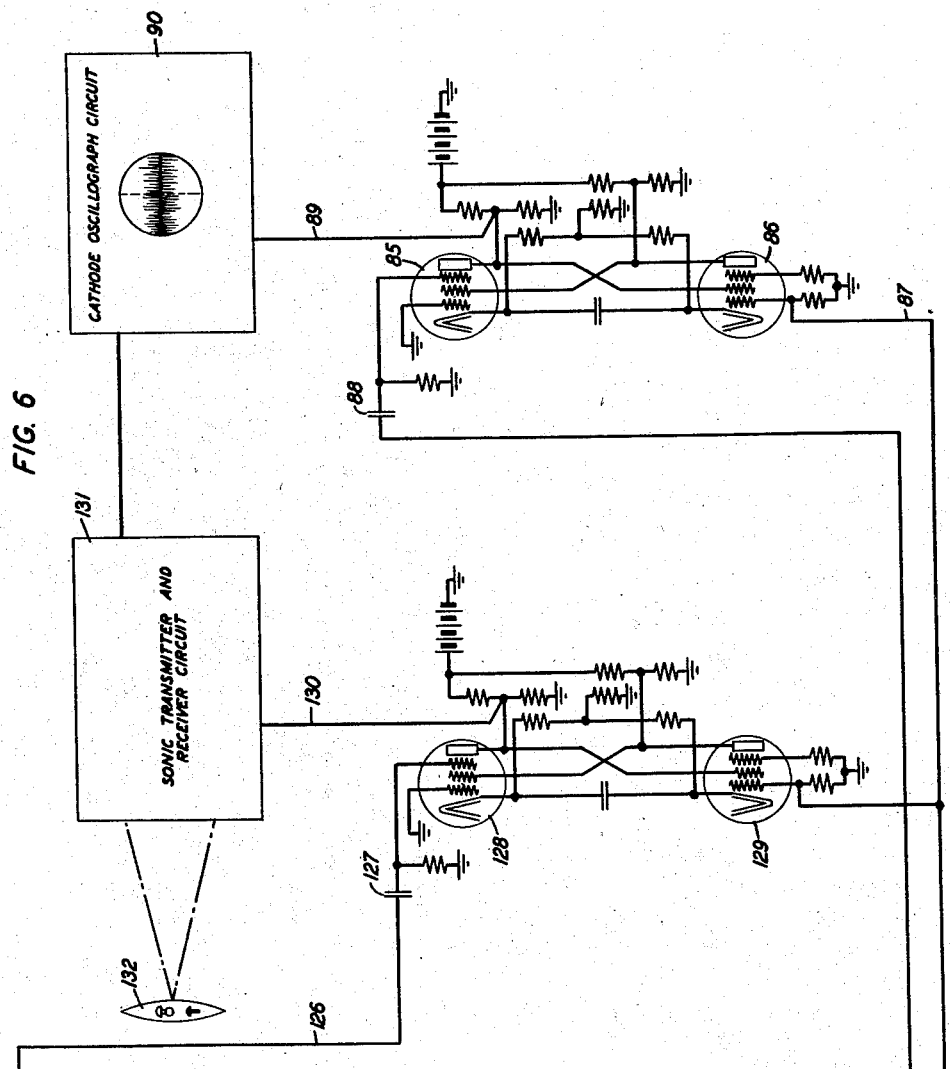

Dec. 30, 1947.  O. R. MILLER  2,433,385
SUBMARINE LOCATING SYSTEM
Filed Nov. 5, 1942  6 Sheets-Sheet 6
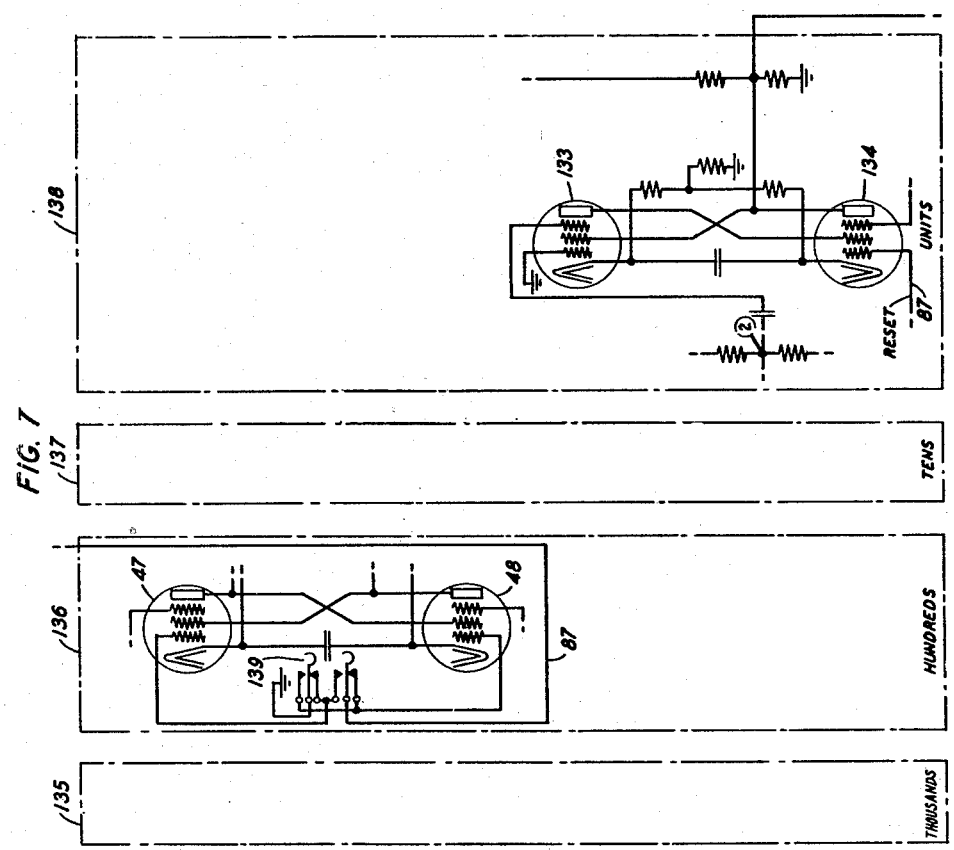
INVENTOR
O. R. MILLER
BY John Attall
ATTORNEY Patented Dec. 30, 1947

2,433,385

UNITED STATES PATENT OFFICE 2,433,385

SUBMARINE LOCATING SYSTEM

Ohmer R. Miller, Morristown, N. J., assignor to Bell Telephone Laboratories, Incorporated, New York, N. Y., a corporation of New York Application November 5, 1942, Serial No. 464,668

7 Claims. (Cl. 177—386)

This invention relates to measuring systems and particularly to submarine detecting devices, the object of the invention being to measure the distance between a test point and a foreign object detected beneath the surface of the sea.

A more specific object of the invention is to provide means to repeatedly transmit a signal and receive a response while adjusting means are being operated which will result upon final adjustment in giving a direct reading of the distance sought to be established. In accordance with this object an adjustable means for very accurately measuring a time interval is employed in combination with means for automatically starting, resetting and restarting such device, whereby the time taken for a signal to be transmitted and a return signal to be received may be compared to a signal produced by such time means.

Devices by which a signal may be transmitted under water to be reflected and returned by a foreign object in the water are well known. Heretofore the time between the transmission of such a signal and its return has been a matter of guesswork and while an experienced operator comes to be an excellent judge of such intervals, it is, nevertheless, an inaccurate and indefinite method. The present invention, however, is aimed at taking all guesswork out of this operation by employing a highly accurate time measuring device, depending on the principle of counting a large number of accurately spaced electrical impulses. By way of example and for a special convenience which will appear hereinafter, a source of 800 cycle current is used to supply a train of accurately spaced impulses so that over a period of one second a count of eight hundred will be made. Such a counting device is adjustable by a plurality of handles or knobs each arranged to take any one of ten positions and each representing a digit of a number to be indicated by the final setting of such device. Such a device may aptly be termed a decade particularly as this term is commonly applied to it by those skilled in the art. Each different setting of this decade, then will cause the counting device to count a different and corresponding number of impulses.

The testing device being started in operation, opens a so-called gate to connect the source of impulses to the counting device which immediately starts to count such impulses. Simultaneously a signal is sent to the submarine detecting signal device which transmits a signal. Therefore, during the travel of such signal to and from the foreign object being located, time is being counted so that the interval for which the decade is set may be compared with the time taken for the test signal to complete its travels. At a given time after the end of this timed interval a signal is sent to a recycling circuit which in turn controls the gate circuit which stops the flow of the accurately spaced impulses to the counting device.

The operation of the recycling circuit constitutes an automatic circuit operation which results in the resetting of the counting device, a pause to allow the circuit of the counting device to settle down so that false operation will not ensue and then the restarting of the operation. With such automatic operation the decade may be adjusted from time to time until a setting is achieved which will produce an indication that the time measured is equal to the time of the travel of the test signal to the foreign object and back.

A feature of the invention is a combination of means to automatically measure different predetermined time intervals, and to automatically reset and restart the counting means.

Further, in accordance with the present invention, a signal receiver is used which will start into operation just before the reflected return signal is to be received. While it is usual to have a signal receiving device operative at all times, it is much more desirable for the sake of great accuracy to extend the whole range of the signal receiver over only a small time interval or, in other words, over only a fractional part of the total time interval employed in the testing operation. In order to do this such signal receiver is only started into operation just before the expected return of the test signal. In accordance with certain figures given hereinafter by way of example, the source of the train of accurately spaced impulses is an eight hundred cycle interrupter. If 1,862 cycles of current from such a source are counted, then a time interval of 2.3275 seconds is measured but the signal receiver is not set into operation until within a count of 500 pulses or a time interval of .625 second before the end.

Due to the fact that the setting of the decade at the figure such as 1,862 is being constantly varied, it is difficult to provide a simple means whereby the signal receiver may be made to start into operation when 1,862 minus 500 pulses or 1,362 pulses have been counted, and since it would be awkward to set the decade at 1,362 and then have to mentally add the factor 500 at each operation, a novel means of compensation has been here employed. Thus the counting device which has a normal starting position corresponding to the setting 0000 of the decade is actually started from a setting of 0500 so that by the time that 1,362 pulses have been counted, the position determined by the setting of the decade at 1,862 will be reached. Thus in effect a time of 0.625 second is subtracted from the beginning of the counting operation and then added at the termination thereof.

It will be readily understood that even higher accuracy may be attained by spreading the period of operation of the signal receiving device over a smaller time interval, say .1250 second, so that the start will be .0625 second corresponding to the count of 50 pulses before the signal is expected to be received.

A feature of the invention, therefore, is a means for counting a known time interval in comparison with an unknown time interval and for automatically shifting such counting operation in time to compensate for the time of operation of a signal receiver.

Further in accordance with the present invention a means for adjusting the signal receiver is provided. Thus if it is desired that such re-receiver is to cover a range of 1,000 pulses the time impulse generator may be adjusted to send out two pulses exactly five hundred pulses apart. The first of these two pulses is then employed to start the signal receiver and the second is observed in the same manner as an ordinary received signal. By this means the ordinarily provided adjustment of the signal receiver may be varied until such a test signal is observed to occur exactly at the center line of the device. Such device may thereafter be used in regular service with full assurance that when the decade is properly set the observed signal will appear exactly at the center line.

Another feature of the invention is, therefore, a means to mark off a predetermined time interval by sending out a pair of pulses accurately spaced which may be used as test signals to test the accuracy of a signal receiving device.

Other features will appear hereinafter.

The drawings consist of six sheets having nine figures, as follows:

Fig. 1 is a schematic diagram showing how the various circuit elements are arranged to carry out the present invention;

Fig. 2 is a timing diagram showing the time relations between the various operations;

Fig. 3 is a circuit diagram containing detailed circuits of the gate and recycle circuits;

Fig. 6 is a diagram partly schematic showing in full circuit diagram the signal start circuit and the sweep start circuit and indicating the locating signal transmitting and receiving circuit, and the oscilloscope;

Fig. 7 is a schematic diagram indicating the thousands, hundreds, tens and units counters by rectangles with fragmentary circuit diagrams in the hundreds and units counters to explain special points in connection with the invention;

Fig. 8 is a chart to show the sequence of operation of the counting tubes; and

Fig. 9 is a diagram showing how Figs. 3, 4, 5 and 6 may be placed to provide a complete circuit diagram.

Figure 4:
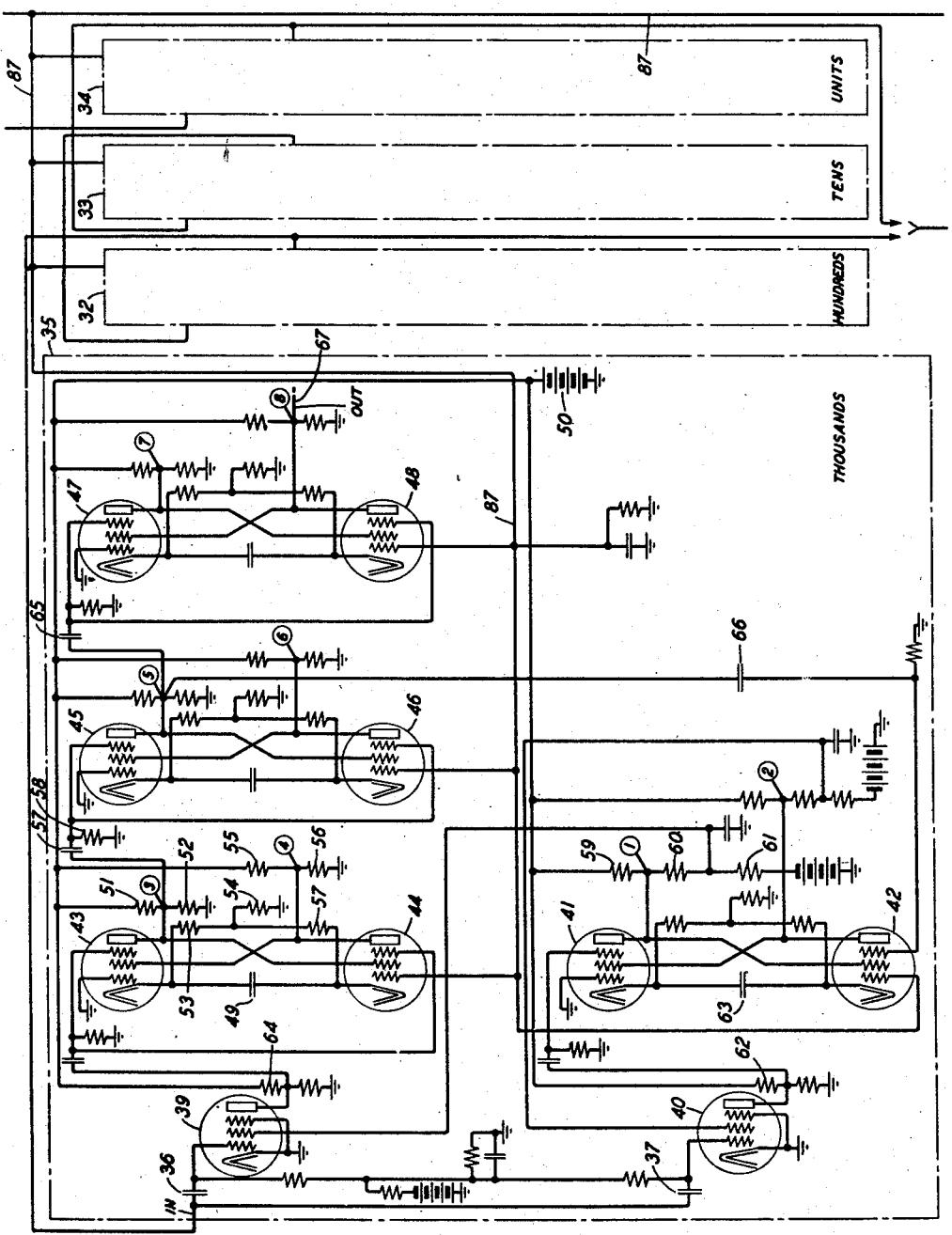
Fig. 4 is a diagram partly schematic showing in full circuit diagram one impulse counter and indicating three others, it being intended to describe by way of example a four digit system.

This invention may be understood by the following description of the schematic diagram of Fig. 1. The invention is shown as a means cooperating with a submarine detecting device the details of which are not here disclosed. Such a device consists generally of means to send out a signal and to receive a return signal. If there is a foreign object in the water the outgoing signal will be reflected back as an echo and the time taken between the transmission of the signal and the reception of the echo is a direct measure of the distance between the test point and the foreign object. Due to the fact that the return signal or echo is greatly attenuated it is not of the same order as the outgoing signal and therefore cannot be used for direct action. Ordinarily when a time interval is to be measured impulses marking the beginning and the end of the interval are used as start and stop pulses to operate a gate circuit which thereupon allows a flow of precisely timed pulses to a counting device so that the number counted will be in direct relation to the measured time interval. However, this return signal or echo is too feeble to act as a stop signal, and if amplified sufficiently for that purpose would produce unreliable results since other foreign pulses unavoidably received by the receiving apparatus would also be amplified and might give rise to false operation of the gate circuit. Experience has proved, however, that if the receiving device has been connected to operate an oscilloscope the return signal or echo may be definitely recognized.

In the jargon of the operators of these devices the signal may be seen "in the grass" which expression rather aptly describes the results attained with an oscilloscope. The noise, static or other source of pulses picked up appears as a buzz, rather dense and often of greater amplitude than the signal being observed. The signal, however, is of a characteristic shape and is sufficiently distinct to be definitely recognized.

Therefore a timed impulse generator is employed, which generator may be adjusted to transmit a pulse at the conclusion of any time interval desired. Now if the return signal or echo is viewed on an oscilloscope in comparison with such a timed pulse and the timed impulse generator is adjusted until the comparison shows equal times then the last setting of such adjustment means, which may aptly be termed a decade, will be a reading of the time interval which it is desired to measure and this interval will be a measure of the distance between the test point and the foreign object.

By way of example, let it be assumed that a measurement is made and the reading of the decade comes out as 1,862. If the oscillator used is a source of 800 cycle current, this would indicate that a time interval of 2.3275 seconds had been measured. It is known that the signal used travels at the rate of 1,600 yards per second. Therefore, the signal has travelled 3,724 yards, but since this is from the test point to the object and back, the object must be half that distance or 1,862 yards away. Thus by choosing an oscillator which has a rate corresponding to the rate of travel of the signal through water a direct reading may be made.

Using an 800 cycle oscillator and a four digit decade any time interval from 0 to 12.5 seconds may be measured corresponding to 0 to 10,000 yards which amply provides for a range up to 5,000 yards which is taken as the usual limit for these measurements.

In operating this device the approximate distance may be judged by the usual methods depending on the skill and experience of the operator or the entire range may be explored quickly by sequentially setting the thousands dial on its ten different positions. While other methods might be used, this is found by practical experience to be very satisfactory. The decade, indicated in Fig. 1 by the squares 1, 2, 3 and 4, is then set at such approximate reading. Thereafter a starting key incorporated in the gate circuit 5 is depressed for an instant to place the circuit into operation. This opens the gate 5 and allows current from the precision oscillator 6 to flow to the timed impulse generator comprising the counters 7, 8, 9 and 10. At the same instant a pulse is transmitted to the start circuit 11 to cause the submarine detecting device 12 to transmit its signal.

At the end of the interval measured by the timed impulse generator an impulse is sent to the sweep start circuit 13 which thereupon starts the sweep of the oscilloscope 14. If the adjustment is perfect, then at the instant that the sweep reaches the vertical center line of the oscilloscope 14, the return signal from the submarine detecting signal device 12 will be transmitted to the oscilloscope where it appears as a recognizable signal. The setting of the decade will then indicate the distance of the foreign object from the test point.

The method of adjustment of the oscilloscope is as follows. It has been shown that by the use of a proper frequency for the source of oscillations the setting of the decade adjusting means of the timed impulse generator may be made to give a direct reading in the number of yards distance between the test point and the foreign object. Now let us say that it will be considered sufficiently accurate if the return signal is viewed in the oscilloscope within a range of one thousand yards. That is, experience has shown that an operator may judge by ear alone the distance to be measured within a thousand yards so that if the first adjustment of the decade is made to correspond to the judged distance then the return signal will probably be seen on the oscilloscope, since the sweep start circuit will be set to five hundred yards before to five hundred yards beyond the setting of the decade. Having then brought the signal to be observed within the range of the oscilloscope the decade may be adjusted until the observed signal occurs at the exact center line whereupon the reading of the decade will be a direct measure of the distance sought to be established.

For quick and rough operation the oscilloscope may be set to have the sweep travel over a great distance. By this means little or no time is lost in bringing the signal within the range of the oscilloscope but this is at the expense of accuracy in the distance measured. If extreme accuracy is desired then the oscilloscope may be adjusted to have the sweep travel over a short range, say 100 yards.

Taking the 1,000 yards then, by way of example, the sweep must be made to travel a time corresponding to five hundred yards before the center line is reached. This means that the last five hundred yards is viewed in the oscilloscope or in other words that the sweep is started in operation five hundred yards before the return signal is detected. Now if the sweep is started in the exact time indicated by the decade the exact distance when the device is properly adjusted so that the return signal occurs at the zero or center line will be the reading of the decade plus five hundred. Since such calculations must be avoided, means may be provided to delay the transmission of the locating signal. Thus as means for making the reading of the decade correspond truly to the distance measured, the pulse passed from the timed impulse generator to the start circuit 11 may be delayed after the gate circuit 5 has been opened until five hundred pulses have been counted. Thus if the start circuit 11 operates on the five hundredth pulse and the return signal is not seen in the oscilloscope until five hundred pulses, corresponding to five hundred yards, beyond the timed pulse from the timed pulse generator, then the reading of the decade will be in true correspondence with the distance to be measured. As an alternative method, means are provided to preset the counter so that the count is started from five hundred. Thus the reading of the decade will represent the true distance being measured. It follows that if the decade reads 1,862 and the signal is observed at what would be 1,862+500 or 2,362 then the true reading would be 2,362—500 or 1,862.

The timed impulse generator working through a circuit which may be termed an integrator and designated by the numeral 15 in Fig. 1 sends the impulse to the sweep start circuit 13 and also to a gate circuit 16 whereby a counter 17 is set into operation. Upon the completion of a count by this device of sufficient duration the recycle circuit will be operated for the purpose of resetting all the circuits involved and then restarting them again. If it is found desirable the time counted by the counter 17 may be adjusted to give the operator sufficient time to readjust the decade.

Two methods of shifting the two time intervals being compared will be explained. The first method consists in delaying the sending of the signal to the start circuit 11 until a time equal to one half the sweep time of the oscilloscope has been counted. By way of example this has been set at a count of five hundred. Therefore, the connection between the impulse counter and the signal start circuit is taken from impulse counter 8 which counts the hundreds digits. When this counter responds to its fifth pulse, a signal will be transmitted over the lead 19 of Fig. 1. Therefore, the locating signal is started late by a count of 500 so that at the end of the measured time interval as determined by the decade the locating signal still has a period of time represented by a count of 500 to travel before it appears on the oscilloscope. In this case all of the various pieces of apparatus which are controlled over the reset lead 20 will be returned to their zero positions.

The operation may then be visualized with the aid of the time diagram of Fig. 2. This shows a single cycle of operation. The time set by the decade is counted over a period from the time designated start of count. One half the sweep time thereafter the time of the travel of the locating signal is started. At the end of the time set by the decade the sweep is started so that the end of the travel time of the location signal should coincide with the middle of the sweep time. Therefore if the decade has been properly set the return signal will be seen at the center line of the oscilloscope.

At the end of the time set by the decade the counter 17 will start into operation and at some convenient time thereafter as determined by experience and the time required by the operator to properly adjust the decade the recycle operation will start. The gate 5 is immediately closed and shortly thereafter a reset pulse is transmitted which will return all the apparatus to normal. Shortly after the reset pulse and at a time interval which is sufficient for the apparatus to have definitely regained their normal positions the gate 6 is opened whereupon the full cycle of operations is repeated.

Another method of shifting the relation between the two time intervals which are being compared is to preset the impulse counter so that the count instead of starting at 1 will start say at 501. In this way if the decade is set at 1,862 then only 1,362 pulses will be counted and since the time of the location signal begins with the beginning of such count it effectively starts 500 pulses after the time measuring operation controlled by the decade.

In this case the reset lead to impulse counter 8 instead of returning this counter to zero will return it to five. As will be seen hereinafter a key may be provided which will transfer the reset lead from one point to another so that with the key in one position the counter will be returned to zero and in another position the counter will be set at five.

Also in this case the lead 19 of Fig. 1 will be taken from impulse counter 10 instead of impulse counter 8 since the signal start circuit is to be enabled as soon as the gate 5 is opened.

The complete operation of this device will be understood from the following description. Assuming that all the apparatus is in normal condition the device may be put into operation by the operation of a key or switch 21. This connects a precision oscillator 22 through a condenser 23 to tube 24 in the gate circuit shown in the upper part of Fig. 3. Throughout the drawings whenever ionic tubes are shown the filaments for heating such tubes are indicated but the battery supply is not shown since the manner of making such connections is well known and the addition of such circuits would unnecessarily complicate the drawings. The alternating current supplied by the precisions oscillator is in the form of a sinusoidal wave whose frequency is very accurately regulated. This wave is biased through a connection through resistance 25 to a potentiometer point formed by the junction of resistances 26 and 27 between negative battery and ground. The plate of tube 24 being connected through condenser 28 and resistance 29 to ground and to the grid of inverted tube 30, the output of tube 24 will appear on the grid of tube 30 as a train of accurately spaced negative pulses. Tube 30 inverts these so that conductor 31 supplies a train of accurately spaced positive pulses to the counting devices.

As shown in Fig. 4 there are four counting devices shown in cascade, one being shown in full and the other three being shown schematically. If that one shown in detail is arranged as the thousands counter then those indicated by the rectangles 32, 33 and 34 will be the hundreds, tens and units counters respectively. Each counter has an "in" and an "out" conductor and the pulse supply lead 31 will be connected to the "in" conductor of the units counter 34, the "out" conductor of the units counter 34 will be connected to the "in" conductor of the tens counter 33, the "out" conductor of the tens counter 33 will be connected to the "in" conductor of the hundreds counter 32, and the "out" conductor of the hundreds counter 32 will be connected to the "in" conductor of the thousands counter 35. For purposes of explanation it will therefore be assumed that a train of positive pulses will appear on the "in" conductor of the thousands counter 35 where after passing through condensers 36 and 37 will appear on the control grids of tubes 39 and 40, respectively.

Throughout this device a large number of counting tubes are employed. By way of example a single pair will be described in detail so that the operation of the device as a whole may be readily understood. The principle of operation is fundamentally the same as that of the well-known Eccles and Jordan circuit, disclosed in British Patent 148,582. In the present circuit the tubes are, however, pentodes with the anode of each connected to the screen grid of the other. When a negative impulse is applied to the suppressor grid of both, then both are rendered non-conducting. When the said negative impulse has ceased, the combination of the two tubes is left in an extremely unstable state so that the slightest influence will determine which of the two is to become conducting to the exclusion of the other. This extremely slight influence is supplied by a condenser 49 connected between the cathodes of tubes 43 and 44 whose operation will be described by way of example. While tube 43 is active and tube 44 is inactive condenser 49 is charged in one direction and while tube 44 is active and tube 43 is inactive condenser 49 is charged in the opposite direction. When the negative impulse is applied to the two suppressor grids, condenser 49 becomes discharged but there is left a slight residual charge, the magnitude of which depends on the effective length of the said negative pulse. At the termination of this negative pulse the said slight residual charge on condenser 49 is sufficient to determine which of the two tubes will then become active. If tube 43 has been active before the negative pulse, then tube 44 will become active thereafter. Thus one negative pulse will render tube 43 inactive and tube 44 active and a second pulse will reverse this condition and render tube 44 inactive and tube 43 active.

Throughout the circuits to be described a large number of these counting pairs are employed all of which operate in the same manner. It will be found that the upper tube of each pair is normally active; that is, it is in a conducting state and has a low potential on its anode. Conversely the lower tube of the pair is normally inactive; that is, it is in a non-conducting state and has a high potential on its anode.

It will be noted that the anode of each tube is in a potentiometer circuit. For tube 43 this potentiometer circuit may be traced from a high positive battery 50 through resistance 51 and resistance 52 to ground. The anode of the tube is connected to the potentiometer point between resistances 51 and 52, which for purposes which will appear hereinafter is connected to a circle having the numeral 3 therein. Also a circuit constituting a potentiometer may be traced from battery 50, resistance 51, the anode cathode path within the tube, resistance 53 and resistance 54 to ground. The resistances of the tube, 53 and 54 are thus in parallel with resistance 52 and under certain circumstances the tube will operate without the resistance 52. Now when the tube is non-conducting or inactive there being little if any current flow in this potentiometer circuit, the potential of the anode (and the screen grid of the companion tube) is at a comparatively high positive value. Thus, the tube 44 is enabled by a comparatively high positive screen grid potential. However, when a negative potential is applied to both suppressor grids, both tubes 43 and 44 become non-conducting and hence a comparatively high positive potential is applied to the screen grid of each. Hence, when the negative potential is removed from the suppressor grids both tubes are in a condition to become active or conducting. The choice of which one prevails rests with the condenser 49 as hereinbefore pointed out.

When tube 43 is in an active or conducting state the current flow in its anode cathode circuit affects the potentiometer point between resistances 51 and 52 so that the potential thereof is at a comparatively low positive value. Hence the screen grid of the companion tube is at a comparatively low positive value and this tube is held in a non-conducting or inactive state.

The potentiometer circuit for tube 43 has been described. Tube 44 has a similar potentiometer circuit consisting of resistances 55, 56, 57 and 54.

It should be noted that as a tube goes from a non-conducting to a conducting state its potentiometer point suddenly drops from a comparatively high to a comparatively low positive value. Hence as tube 43 becomes active the potentiometer point between resistances 51 and 52 drops and condenser 57 translates this sudden drop in potential into a negative pulse to be applied to the suppressor grids of tubes 45 and 46. The charge thus put on the condenser 57 is dissipated through resistance 58 to ground.

Thus the pair of tubes 43 and 44 provide a means which sets up a stable condition which will remain fixed, but which instantly responds to an incoming negative pulse to reverse the previous condition of the tubes. Also the tubes in their reversal will generate a like negative pulse when the reversal in condition is in a given direction so that for every two incoming negative pulses a single outgoing negative pulse is generated.

In the detailed circuit arrangement of Fig. 4 a ten pulse counter is shown in full and other similar counters are indicated whereby a number of pulses may be counted on a decimal basis. There are ten tubes 39 to 48 inclusive, provided, of which five, namely 40, 41, 43, 45 and 47 are normally active.

Tube 41 being normally active holds the potential of the potentiometer point between resistances 59 and 60 to a comparatively low positive potential. Likewise the potentiometer point between resistances 60 and 61 which is connected to the screen grid of tube 39 is held down to the point where tube 39 is blocked and will not transmit the incoming pulses. Tube 40, however, will invert the incoming positive pulse into a negative pulse since the rise in cathode-anode current flowing through resistance 62 causes a drop in the potential of the anode. Hence a positive pulse incoming to tube 40 appears on the suppressor grid of tube 41 as a negative pulse. The pair of tubes 41 and 42 are similar to the counting tubes heretofore described except that the incoming negative pulse is applied only to the suppressor grid of tube 41. Tube 41 is therefore rendered inactive and hence under control of condenser 63 the condition of tubes 41 and 42 is reversed, 41 now becoming inactive and tube 42 becoming active.

The first of the ten incoming pulses thus reverses the condition of tubes 41 and 42 and by raising the potential of the point between resistances 60 and 61 renders the tube 39 responsive to the following impulses.

The second impulse controlling tube 39 and due to the resistance 64 now is inverted into a negative pulse to the suppressor grid of tubes 43 and 44 so that the condition of the tubes 43 and 44 is reversed, tube 44 becoming active and tube 43 becoming inactive.

The third impulse again reverses the condition of the tubes 43 and 44, rendering tube 43 active and tube 44 inactive and at the same time affects the next pair of tubes 45 and 46, rendering tube 45 inactive and tube 46 active.

The fourth impulse now reverses the condition of tubes 43 and 44, rendering tube 43 inactive and tube 44 active.

The fifth pulse reverses the condition of both pairs 43 and 44 and 45 and 46, rendering tubes 43 and 45 active and tubes 44 and 46 inactive. At the same time a negative impulse is applied through condenser 65 to the suppressor grid of tube 47 and through condenser 66 to the suppressor grid of tube 42. Thus the fifth impulse reverses the condition of tubes 47 and 48 rendering tube 47 inactive and tube 48 active. The negative impulse applied to the suppressor grid of tube 42 will reverse the condition of tubes 41 and 42, tube 41 being rendered active and tube 42 being rendered inactive. Tubes 39 and 40 are also reversed, tube 39 being rendered inactive, and tube 40 being rendered active.

The sixth impulse will reverse the condition of tubes 41 and 42, rendering tube 41 inactive and tube 42 active. Tube 39 is now rendered active and tube 40 inactive as before.

The seventh impulse reverses the condition of tubes 43 and 44, rendering tube 43 inactive and tube 44 active.

The eighth impulse reverses the condition of the pair 43 and 44 and the pair 45 and 46, rendering tubes 43 and 46 active and tubes 44 and 45 inactive.

The ninth pulse reverses the condition of the pair 43 and 44, rendering tube 43 inactive and tube 44 active. It will now be found that all the tubes are the reverse of normal, that is, tubes 42, 44, 46, 48 and 39 are now active and tubes 41, 43, 45, 47 and 40 are inactive.

The tenth pulse results in a change back to normal. Here, as in the fifth pulse, a negative pulse is transmitted to tube 42 so that the condition of the pair of tubes 41 and 42 is reversed.

On this tenth pulse as tube 48 becomes inactive its anode changes from a comparatively low positive potential to a comparatively high positive potential. This sudden rise in potential appears on the outgoing conductors 67 and thus constitutes a positive pulse to the next set of tubes. If a plurality of sets of tubes of this nature is used the first will serve to register the units digit of a number, and the succeeding sets will serve to register the tens, hundreds, thousands, and so on digits for as many places as may be desired.

The above-described action of the tubes may be visualized by the help of the chart, Fig. 8. In this chart the tubes are numbered one to eight, inclusive, to correspond to the numbers in the circles connected to the potentiometer points for the various tubes. Where a solid black dot appears in the chart it represents a comparatively high positive potential on such potentiometer point. In some cases there will be an outlined dot and then a dotted line to a solid dot to indicate that the result of the pulse was to render the tube with the outlined dot active (comparatively low positive anode potential) and the other inactive (comparatively high positive anode potential). Thus pulse number one results in the reversal of the condition of tubes 1 and 2 (tubes 41 and 42, respectively).

The chart of Fig. 8 thus depicts the permutation code whereby ten various combinations of the conditions of tubes 41 to 48, inclusive, may be used to record the ten digits. Fig. 8 also depicts the out pulse transmitted on the tenth pulse (the zero pulse for the tens recorder) in the form of a graph.

Figure 5:
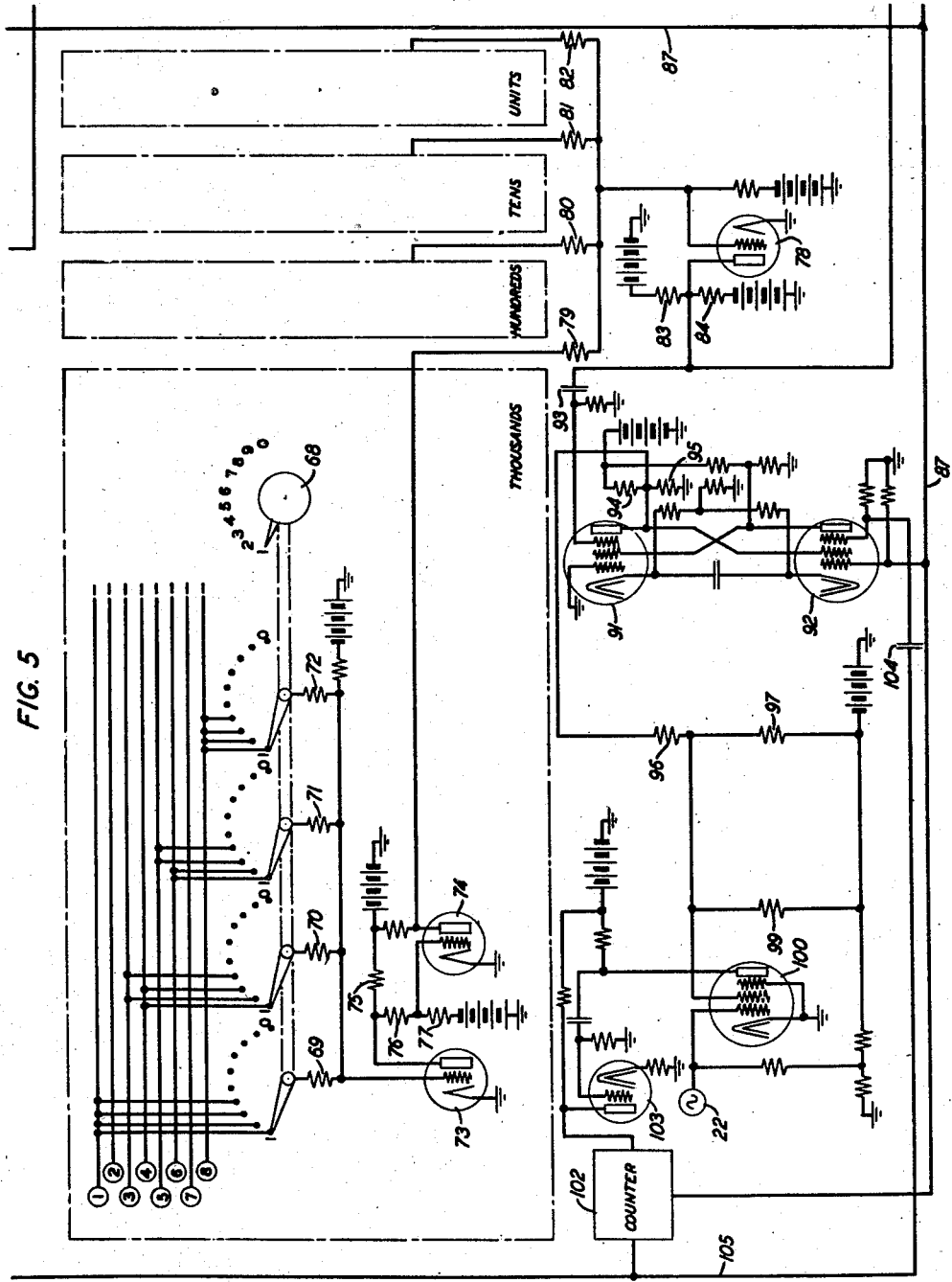
Fig. 5 is a diagram also partly schematic showing in full circuit diagram one decade control, indicating three others, the circuit of what is termed the integrator and the gate and indicated counter for controlling the recycle circuit.

Fig. 5, with the exception of the gate and counter in the lower left-hand corner represents the integrator 15 of Fig. 1. From each counter there is brought a bundle of eight leads from the potentiometer points of the eight counting tubes, the numerals within the circles at the left-hand ends thereof indicating that these leads are connected to the potentiometer points correspondingly designated. By means of a decade control 68 which has ten positions numbered 1 to 0 inclusive connections according to the permutation code of Fig. 8 may be made through a network of four resistances 69, 70, 71 and 72 to the grid of triode 73. These resistances are so proportioned that when all four and only when all four are connected to potentiometer points each of which is at a high positive potential, the tube 73 will become active. Thus if the decade control 68 is set at a particular point and when the arrangement of the tubes in the counter reaches that corresponding point, tube 73 will become active. Its anode is connected to a point in the potentiometer consisting of resistances 75, 76 and 77 between positive and negative batteries and hence when tube 73 becomes active the potential of the point between resistances 75 and 76 falls from a comparatively high to a comparatively low positive potential. Tube 74 has its grid connected to a potentiometer point between resistances 76 and 77 and since this grid now also goes from a comparatively high to a comparatively low positive potential tube 74 becomes inactive. Hence the anode of tube 74 rises to a comparatively high positive value.

In the same way that a network of four resistances 69 to 72 were used to render tube 73 active, another network of four resistances, 79 to 82 are used to control a similar tube 78. The resistance 79 is connected in a potentiometer circuit controlled by the anode of tube 74 in the thousands counter and similarly resistance 80 is controlled from the hundreds counter, resistance 81 is controlled from the tens counter and resistance 82 is controlled from the units counter. Now when the four counters simultaneously reach the code arrangements in accordance with the setting of their decade controls, tube 78 will become active and change the potentiometer point between resistances 83 and 84 from a comparatively high to a comparatively low positive potential.

Since the rearrangement within the counters is proceeding at a rapid rate (800 movements per second by way of example) this potential change on the anode of tube 78 is only in the form of a negative pulse and this pulse marks the end of the time interval which the decade controls were set to measure.

The negative pulse thus generated by the rapid fall of potential on the anode of tube 78 is used for two purposes as outlined in the description of the schematic of Fig. 1 (one) to enable the start circuit for the oscilloscope and (two) to enable the recycle counter.

The oscilloscope and its start circuit are shown in the right-hand portion of Fig. 6, the oscilloscope being shown schematically and the start circuit being shown in detail. The start circuit comprises a pair of tubes similar to the pair 41 and 42 of the counter in Fig. 4. This pair operates exactly like the counting pair 43 and 44 except that the two suppressor grids are not connected together so that a single negative impulse will operate to render tube 85 inactive and tube 86 active, these tubes then remaining in this condition until a negative reset pulse is transmitted over the reset lead 87 connected to the control grid of tube 86. Therefore, the rapid fall of potential on the anode of tube 78 is translated by the condenser 88 into the necessary negative pulse for changing the condition of the pair of tubes 85 and 86, whereupon the potentiometer point of the anode circuit of tube 85 goes from a comparatively low to a comparatively high positive potential. This is communicated over lead 89 to start the sweep of oscilloscope 90. The circuits of this device are not shown as they are well known.

The pulse from the anode of tube 78 also enables the start circuit for the recycle counter, consisting of the pair of tubes 91 and 92. Through condenser 93 the rapid fall of potential of the anode of tube 78 is translated into the necessary negative pulse to reverse the condition of tubes 91 and 92, rendering tube 91 inactive and tube 92 active.

As tube 91 becomes inactive the potentiometer point between resistances 94 and 95 rises and by the same token the potentiometer point between resistances 96 and 97 rises to affect the screen grid of tube 100 to render tube 100 active. Thereupon the gate is opened so that current from the precision oscillator 22 may be admitted to the counter 102. Connection from the oscillator 22 to the circuit of the control grid of tube 100 may be made at lead 101 (Fig. 3) so that the key 21 may control this gate as well as that of Fig. 3.

The counter 102 will respond to the train of positive impulses into which tubes 100 and 103 convert the output of oscillator 22.

The counter 102 may be exactly the same as the counters of Fig. 4 and the output lead 105 may come from the anode circuit of the last tube of an integrator such as tube 78. Therefore when such tube in response to the counter reaching a predetermined count drops its anode potential condenser 104 translates this into the necessary negative pulse for application to the suppressor grid of tube 92 whereupon the condition of tubes 91 and 92 is reversed, the gate is closed and the counter 102 is stopped on the count reached. Therefore the output conductor 105 is now held at a comparatively low positive potential, and this change is used to operate the recycle circuit of Fig. 3 in the manner to be shortly described.

The counter 102 is employed to count off a necessary time interval beginning with the transmission of the start pulse for the starting of the sweep circuit of the oscilloscope. If the operator of this device requires a considerable time to readjust the decade controls after viewing the incoming signal then the counter 102 may be adjusted to count off a correspondingly long signal. If on the other hand the operator through experience has become expert in handling the apparatus this period may be shortened. The period may be fixed if so desired and the decade adjustable controls dispensed with, the resistances such as 69 to 72 and 79 to 82 being permanently associated with certain given potentiometer points. Again if the relative times from the beginning of the operation to the start of the sweep of the oscilloscope and that taken by the sweep are quite different, then the time counted by the counter 102 may be made very short, in fact may be reduced to zero since the recycling operations may proceed to start a new cycle of operations even while the oscilloscope is performing its part. This would have the advantage of having the appearance of the return location signal recur at more frequent intervals. The counter 102, then may be fixed or it may be adjustable or in certain extreme cases it may be eliminated altogether. In this latter case the lead 105 may be taken from the potentiometer point connected to the anode of tube 92 so that the recycle circuit may be started by a drop in potential on conductor 105. Again it will be noted that the counter 102 is arranged in a circuit whereby it will count any predetermined number and then be stopped on that number whereas the counters of Fig. 4 will, as shown, pass by the number to be counted and continue to count for an additional period as determined by the gate and recycle circuit of Fig. 3.

When the potential of conductor 105 falls the triode 106 in Fig. 3 becomes non-conducting. Therefore the potentiometer formed of resistances 107, 108 and 109 is affected and the point between resistances 108 and 109 changes from a comparatively low to a comparatively high positive value. This rise in potential is communicated through diode 110 to charge condenser 111. This in turn raises the potential on the grid of triode 112. The condenser 111 will discharge through resistances 113 and 114 in a time and at a rate controlled by the capacity of condenser 111 and the value of the resistances 113 and 114. Hence although the potential on conductor 105 may almost immediately rise again due to the reset signal and the potential of the anode of the diode 110 may almost immediately fall, the maintenance of the comparatively high positive potential on the grid of tube 112 is controlled by the action of condenser 111. Hence the comparatively high positive potential on the grid of tube 112 is held for a period beyond the downward and following upward movement of the potential on conductor 105.

As tube 112 becomes conducting its anode drops in potential and this drop communicated through condenser 115 to conductor 87 constitutes a negative pulse which acts as a reset signal to the apparatus units in Figs. 4, 5, 6 and 7 so that all apparatus is now returned to normal and the potential on conductor 105 rises again as hereinbefore described. In order to allow the various circuits sufficient time to definitely return to normal this reset pulse is prolonged by the action of condenser 111 as described and by the slow discharge of condenser 115. Also condenser 116 whose main function is to lower the potential of the potentiometer point between resistances 117 and 118 to in turn lower the potential of the potentiometer point between resistances 120 and 121 through diode 119, plays some part in prolonging the reset pulse. Upon the enabling of tube 112 therefore the reset pulse is transmitted and the grid of tube 122 is lowered. Due to condenser 123 the period during which the tube 122 is rendered non-conducting is prolonged for a considerable period depicted in Fig. 2 as the period during which the gate is closed. As tube 122 becomes non-conducting its anode circuit rises in potential and this rise being communicated to the grid of tube 124 in the gate circuit controls tube 24 through its screen grid to stop the flow of negative pulses to the counters. As this action takes place the reset pulse is transmitted so that as the counters and other apparatus are returned to normal the train of pulses to be counted is stopped. The triode 122, due to condenser 123 maintains the high potential on the grid of tube 124 for a period longer than the reset pulse so that for a given period after the end of the reset pulse, tube 24 will be rendered non-conducting to start the entire train of operations described.

A manually operated reset key 125 may be provided to place a negative potential on reset conductor 87.

It has heretofore been set forth that there are several ways of slipping the time intervals between the duration of the time of the location signal and the comparison time being counted and two ways have been described. In accordance with the first way the start signal to the circuit 11 of Fig. 1 is delayed until 500 (or any other chosen number) is counted. In accordance with the permutation code depicted in Fig. 8 the tube corresponding to tube 48 in the hundreds counter will go from an inactive to an active condition on the five hundredth impulse so that a conductor leading from the potentiometer point marked by the numeral 8 may be used to start the sonic transmitter and receiver circuit 12. If this point is therefore connected to conductor 126 the five hundredth impulse will then be translated by condenser 127 into the necessary negative impulse to reverse the condition of tubes 128 and 129, rendering tube 128 inactive and tube 129 active. The consequent rise in potential of the anode of tube 128 will then be communicated over conductor 130 leading to the sonic transmitter and receiver circuit 131 whereby a location signal is transmitted to locate a submarine designated in Fig. 6 by the numeral 132. The echo or return signal is then received and transmitted to the oscilloscope where it may be recognized by a trained operator. The circuits and interval arrangement of device 131 are not here described as they are well known.

In accordance with a second method of slipping the two time intervals the start signal to the conductor 126 is sent immediately. In this case as indicated in Fig. 7 another pair of tubes 133 and 134 is employed. Fig. 7 is a schematic representation of the counters of Fig. 4, the rectangle 135 represents the thousands counter, the rectangle 136 represents the hundreds counter, the rectangle 137 represents the tens counter and the rectangle 138 represents the units counter. With the rectangle 138 there is a fragmentary circuit diagram showing how the pair of tubes 133 and 134 may be connected to the number 2 potentiometer point of the units counter so that in response to the first impulse as the tube corresponding to tube 42 becomes active it will change the condition of tubes 133 and 134, rendering tube 133 inactive and tube 134 active. As tube 134 becomes active its anode drops from a comparatively high to, a comparatively low positive potential and since this point may be connected to conductor 126 the condenser 127 will translate this change into the necessary negative pulse to reverse the condition of tubes 128 and 129 for the purposes hereinbefore set forth. The tubes 133 and 134 are used here since the potentiometer point 2 of the units counter changes continuously during a counting operation and it is only desired to have a single negative impulse to change the condition of the tubes 128 and 129. Hence the tubes 133 and 134 reverse on the first impulse of a count and then remain in this condition until the resetting operation.

Also as part of this second method, it is necessary to start the count with 500 already counted. Therefore in the hundreds counter a circuit shown in fragmentary form within the rectangle 136 is employed. This consists of a key which in its normal position as shown connects the reset conductor 87 to the lower tube 48. When the key 139 is operated however the reset conductor is connected to the upper tube 47 so that when the apparatus is returned to "normal" by the reset pulse the hundreds counter will be in the condition it would under other circumstances reach on the five hundredth pulse. In other words the counters are preset at five hundred so that if the decade controls are set at 1,862 then only 1,362 pulses will be counted.

What is claimed is:

1. A locating system for measuring the distance of a foreign object by transmitting a signal from a test point and measuring the time taken for such signal to reach the said foreign object, be reflected therefrom and return to the said test point, comprising means to measure the travel time of said reflected signal, means to measure a predetermined time interval, means controlled by said time interval measuring means for comparing the said two time intervals, means responsive to said time measuring means for automatically resetting and restarting said time measuring means, and means for controlling the length of said measured time interval.

2. A locating system for measuring the distance of a foreign object under water by transmitting a signal from a test point and measuring the time taken for such signal to reach the said foreign object, be reflected therefrom and return to the said test point, comprising means to measure the travel time of said reflected signal, means to measure a predetermined time interval by counting a predetermined number of a train of accurately spaced impulses, means controlled by said time interval measuring means for comparing the said two time intervals, means responsive to said time measuring means for automatically resetting and restarting said time measuring means, and means for controlling the length of said measured time interval.

3. In a locating system for measuring the distance of a foreign object by transmitting a signal from a test point and measuring the time taken for such signal to reach the said foreign object, be reflected therefrom and return to the said test point, an adjustable time interval measuring device, a signal receiver controlled by said time measuring device, said time measuring device having a normal starting position, means for resetting and restarting said time measuring device, and means controlled by the said time measuring device and responsive to the termination of a time interval measured thereby for controlling said resetting and restarting means.

4. A locating system for measuring the distance of a foreign object by transmitting a signal from a test point and measuring the time taken for such signal to reach the said foreign object, be reflected therefrom and return to the said test point, comprising an adjustable time interval measuring device having a normal starting position, a signal receiver for receiving said returning signal, said receiver displaying an incoming signal a definite time interval after being started in operation, means controlled by said time interval measuring device for starting said signal receiver in operation, means for starting said time interval measuring device simultaneously with the transmission of said signal from said test point, and means for starting said time interval measuring device from a point beyond its said normal starting position corresponding to said definite time interval taken by said signal receiver to display said incoming signal, whereby said time interval measuring device will terminate its operation and start said signal receiver in operation at a time prior to the time for the display of said signal equal to the said definite time interval required by said signal receiver.

5. A locating system for measuring the distance of a foreign object by transmitting a signal from a test point and measuring the time taken for such signal to reach the said foreign object, be reflected therefrom and return to the said test point, comprising an adjustable time interval measuring device, said device measuring time intervals by counting pulses from a train of accurately spaced pulses, a precision oscillator for producing a train of accurately spaced pulses, a gate circuit for admitting pulses from said source to said time interval measuring device, means for opening said gate circuit and simultaneously controlling the transmission of a signal from said test point, means controlled by said time interval measuring device for closing said gate circuit at the termination of a measured time interval and for simultaneously enabling a signal receiver, said signal receiver for receiving said signal on its said return from said foreign object, and means controlled by said gate circuit for automatically restarting said train of controlled operations.

6. A locating system for measuring the distance of a foreign object by transmitting a signal from a test point and measuring the time taken for such signal to reach the said foreign object, be reflected therefrom and return to the said test point, comprising a signal receiver adapted to visually display the recepton of said return signal, means for rendering said signal receiver active for a given period of time, said visual display appearing at a location on the display face of said receiver in relation to its occurrence within said given period of time, means for marking the time of the transmission of a pulse from said test point, means for enabling said signal receiver, means for counting time from the transmission of said pulse to the enabling of said signal receiver, means associated with said time counting means for compensating for the time beyond the said enabling of said receiver to the appearance of said signal, and means for adjusting said time counting means to bring the appearance of said signal to a particular point within the range of said receiver.

7. A locating system for measuring the distance of a foreign object by transmitting a signal from a test point and measuring the time taken for such signal to reach the said foreign object, be reflected therefrom and return to the said test point, comprising a signal receiver adapted to visually display the reception of said return signal, means for rendering said signal receiver active for a given period of time, said visual display appearing at a location on the display face of said receiver in relation to its occurrence within said given period of time, means for counting off a time period equal to the transit time of said signal, and means for shifting the period of said counting with respect to the interval constituting the transit time of said signal by an amount equal to half the said given period of time required by said signal receiver whereby said visual display of said return signal is made to accur at the center line of the display face of said signal receiver.

OHMER R. MILLER.

REFERENCES CITED

The following references are of record in the file of this patent:

UNITED STATES PATENTS

| Number | Name | Date |
| --- | --- | --- |
| 2,143,035 | Smith | Jan. 10, 1939 |
| 1,729,595 | Hayes | Sept. 24, 1929 |

FOREIGN PATENTS

| Number | Country | Date |
| --- | --- | --- |
| 448,407 | Great Britain | Dec. 3, 1935 |